US012792944B2

(12) United States Patent
Naveh et al.

(10) Patent No.: US 12,792,944 B2
(45) Date of Patent: Nov. 10, 2026

(54) EFFICIENT TRANSMISSION OF A QUANTUM STATE MEASURED BY A SENSOR OVER A CLASSICAL CHANNEL

(71) Applicant: Classiq Technologies LTD., Tel Aviv (IL)

(72) Inventors: Amir Naveh, Haifa (IL); Shmuel Ur, Shorashim (IL); Eyal Cornfeld, Ramat Gan (IL); Ofek Kirzner, Haifa (IL); Nir Minerbi, Haifa (IL)

(73) Assignee: Classiq Technologies LTD., Tel Aviv (IL)

( * ) Notice: Subject to any disclaimer, the term of this patent is extended or adjusted under 35 U.S.C. 154(b) by 468 days.

(21) Appl. No.: 18/587,533

(22) Filed: Feb. 26, 2024

(65) Prior Publication Data

US 2025/0272588 A1 Aug. 28, 2025

(51) Int. Cl.
*G06N 10/20* (2022.01)
*G06N 10/60* (2022.01)
*G06N 10/80* (2022.01)

(52) U.S. Cl.
CPC ............ *G06N 10/20* (2022.01); *G06N 10/60* (2022.01); *G06N 10/80* (2022.01)

(58) Field of Classification Search
CPC ......... G06N 10/20; G06N 10/60; G06N 10/80
See application file for complete search history.

(56) References Cited

U.S. PATENT DOCUMENTS

2020/0394537 A1* 12/2020 Wang ...................... G06N 7/01
2024/0037435 A1* 2/2024 Susa ...................... G06N 10/00
2024/0062091 A1* 2/2024 Brown .................. G06N 10/00

* cited by examiner

*Primary Examiner* — Scott C Anderson
(74) *Attorney, Agent, or Firm* — Myers Wolin, LLC

(57) ABSTRACT

A method, apparatus and system comprising: a quantum sensor that is configured to measure a quantum state of a physical phenomenon; a quantum computer that is connectable to said quantum sensor, and is configured to execute a parametric quantum circuit a plurality of times, wherein the parametric quantum circuit comprising qubits that are set to represent the quantum state and an inverse ansatz parametric circuit that is configured to receive the quantum state from the qubits and to output a processed state; wherein said quantum computer is configured to iteratively set parameter values of the inverse ansatz parametric circuit until obtaining a parameter value that causes the parametric quantum circuit to output an approximation of a predetermined state; and an output module configured to provide output data that indicates an approximation of the quantum state.

20 Claims, 3 Drawing Sheets

EFFICIENT TRANSMISSION OF A QUANTUM STATE MEASURED BY A SENSOR OVER A CLASSICAL CHANNEL

TECHNICAL FIELD

The present disclosure relates to quantum computing in general, and to communicating and processing measurements associated with quantum sensors, in particular.

BACKGROUND

Quantum computing is a computational paradigm that is fundamentally different from classical computing. In contrast to classical computing, which utilizes bits, quantum computing utilizes quantum bits (qubits). The qubits have unique features, as each qubit can be in superposition, several qubits can be entangled, and all operations on qubits besides measurement (referred to as quantum gates) must be reversible.

Classical sensors, relying on classical physics principles, have long been the cornerstone of sensing technologies. Classical sensors may be used to measure classical data such as the position and distance of objects, temperatures, changes in pressures, the intensity of light, or the like. Quantum sensors, on the other hand, represent a paradigm shift in sensing capabilities, harnessing the principles of quantum mechanics to unlock unprecedented levels of sensitivity and precision.

Unlike classical sensors, which rely on classical physics to detect and quantify physical quantities, quantum sensors leverage the unique properties of quantum states, such as superposition and entanglement, to enable highly precise and sensitive measurements at the quantum scale that surpass the capabilities of classical sensors. This can be done with photonic systems, solid state systems, or the like. By exploiting quantum properties such as entanglement, quantum interference, and quantum state squeezing, quantum sensors can provide unprecedented levels of accuracy in measuring various physical parameters such as electromagnetic fields, quantum phenomena, and gravitational forces.

BRIEF SUMMARY

One exemplary embodiment of the disclosed subject matter is a system comprising: a quantum sensor that is configured to measure a quantum state of a physical phenomenon; a quantum computer that is connectable to said quantum sensor, whereby enabling said quantum computer to receive the quantum state from said quantum sensor; said quantum computer is configured to execute a parametric quantum circuit a plurality of times, wherein the parametric quantum circuit comprising one or more qubits that are set, by said quantum sensor, to represent the quantum state at an initial cycle of the parametric quantum circuit, the parametric quantum circuit comprising an inverse ansatz parametric circuit, the inverse ansatz parametric circuit is configured to receive the quantum state from the one or more qubits, whereby the inverse ansatz parametric circuit is configured to output a processed state; wherein said quantum computer is configured to implement a Variational Quantum Algorithm (VQA) scheme to iteratively set parameter values of the inverse ansatz parametric circuit until obtaining a parameter value that causes the parametric quantum circuit to output an approximation of a predetermined state; and an output module, said output module is configured to provide output data that indicates an approximation of the quantum state, wherein the output data is determined based on the inverse ansatz parametric circuit and the parameter value.

Optionally, said output module is configured to transmit the output data to a second quantum computer in a non-quantum communication channel, wherein said transmit enables the second quantum computer to reconstruct the approximation of the quantum state based on the output data.

Optionally, the second quantum computer is part of a quantum cloud computing platform.

Optionally, the second quantum computer is enabled to reconstruct the approximation of the quantum state based on a value reconstruction circuit, the value reconstruction circuit is configured to reconstruct the approximation of the quantum state, wherein the output data comprises a representation of the value reconstruction circuit.

Optionally, the output data is a representation of an ansatz parametric circuit with the parameter value, wherein the inverse ansatz parametric circuit is an inverse circuit of the ansatz parametric circuit, whereby enabling a second quantum computer to reconstruct the approximation of the quantum state by executing the ansatz parametric circuit with the parameter value.

Optionally, the output data is the parameter value, whereby enabling a second quantum computer to reconstruct the approximation of the quantum state by utilizing an ansatz parametric circuit with the parameter value, wherein the inverse ansatz parametric circuit is an inverse circuit of the ansatz parametric circuit.

Optionally, said system is configured to reset the quantum state of the physical phenomenon between iterations of the VQA scheme.

Optionally, said output module is configured to transmit the output data to a classical computer, wherein said transmit enables the classical computer to utilize the output data to approximate the quantum state.

Optionally, said quantum sensor and quantum computer are housed in a single physical device, whereby the quantum computer is an on-sensor embedded quantum computer.

Optionally, the parametric quantum circuit comprises a detection sub-circuit, the detection sub-circuit is configured to indicate a distance measure of the processed state from the predetermined state.

Optionally, the predetermined state is zero and the detection sub-circuit is a zero detection sub-circuit.

Optionally, the predetermined state is zero.

Optionally, the output data comprises compressed data that represents the quantum state in a compressed manner.

Optionally, the quantum computer comprises a minimal-sized quantum computer that can implement the VQA scheme for the quantum sensor.

Another exemplary embodiment of the disclosed subject matter is an apparatus comprising a processor and coupled memory, said processor being adapted to: receive, at a quantum computer that is connectable to a quantum sensor, a quantum state of a physical phenomenon, wherein said receive comprises receiving the quantum state from the quantum sensor, wherein the quantum sensor is configured to measure the quantum state of the physical phenomenon; execute, at the quantum computer, a parametric quantum circuit, wherein the parametric quantum circuit comprising one or more qubits that are set, by said quantum sensor, to represent the quantum state at an initial cycle of the parametric quantum circuit, the parametric quantum circuit comprising an inverse ansatz parametric circuit, the inverse ansatz parametric circuit is configured to receive the quantum state from the one or more qubits, whereby the inverse ansatz parametric circuit is configured to output a processed state; implement, at the quantum computer, a Variational Quantum Algorithm (VQA) scheme to iteratively set parameter values of the inverse ansatz parametric circuit for different executions of the parametric quantum circuit until obtaining a parameter value that causes the parametric quantum circuit to output an approximation of a predetermined state; and provide output data that indicates an approximation of the quantum state, wherein the output data is determined based on the inverse ansatz parametric circuit and the parameter value.

Yet another exemplary embodiment of the disclosed subject matter is a computer program product comprising a non-transitory computer readable medium retaining program instructions, which program instructions when read by a processor, cause the processor to: receive, at a quantum computer that is connectable to a quantum sensor, a quantum state of a physical phenomenon, wherein said receive comprises receiving the quantum state from the quantum sensor, wherein the quantum sensor is configured to measure the quantum state of the physical phenomenon; execute, at the quantum computer, a parametric quantum circuit, wherein the parametric quantum circuit comprising one or more qubits that are set, by said quantum sensor, to represent the quantum state at an initial cycle of the parametric quantum circuit, the parametric quantum circuit comprising an inverse ansatz parametric circuit, the inverse ansatz parametric circuit is configured to receive the quantum state from the one or more qubits, whereby the inverse ansatz parametric circuit is configured to output a processed state; implement, at the quantum computer, a Variational Quantum Algorithm (VQA) scheme to iteratively set parameter values of the inverse ansatz parametric circuit for different executions of the parametric quantum circuit until obtaining a parameter value that causes the parametric quantum circuit to output an approximation of a predetermined state; and provide output data that indicates an approximation of the quantum state, wherein the output data is determined based on the inverse ansatz parametric circuit and the parameter value.

Yet another exemplary embodiment of the disclosed subject matter is a method comprising: receiving, at a quantum computer that is connectable to a quantum sensor, a quantum state of a physical phenomenon, wherein said receiving comprises receiving the quantum state from the quantum sensor, wherein the quantum sensor is configured to measure the quantum state of the physical phenomenon; executing, at the quantum computer, a parametric quantum circuit, the parametric quantum circuit comprising one or more qubits that are set, by said quantum sensor, to represent the quantum state at an initial cycle of the parametric quantum circuit, the parametric quantum circuit comprising an inverse ansatz parametric circuit, the inverse ansatz parametric circuit is configured to receive the quantum state from the one or more qubits, whereby the inverse ansatz parametric circuit is configured to output a processed state; implementing, at the quantum computer, a Variational Quantum Algorithm (VQA) scheme to iteratively set parameter values of the inverse ansatz parametric circuit for different executions of the parametric quantum circuit until obtaining a parameter value that causes the parametric quantum circuit to output an approximation of a predetermined state; and providing output data that indicates an approximation of the quantum state, wherein the output data is determined based on the inverse ansatz parametric circuit and the parameter value.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
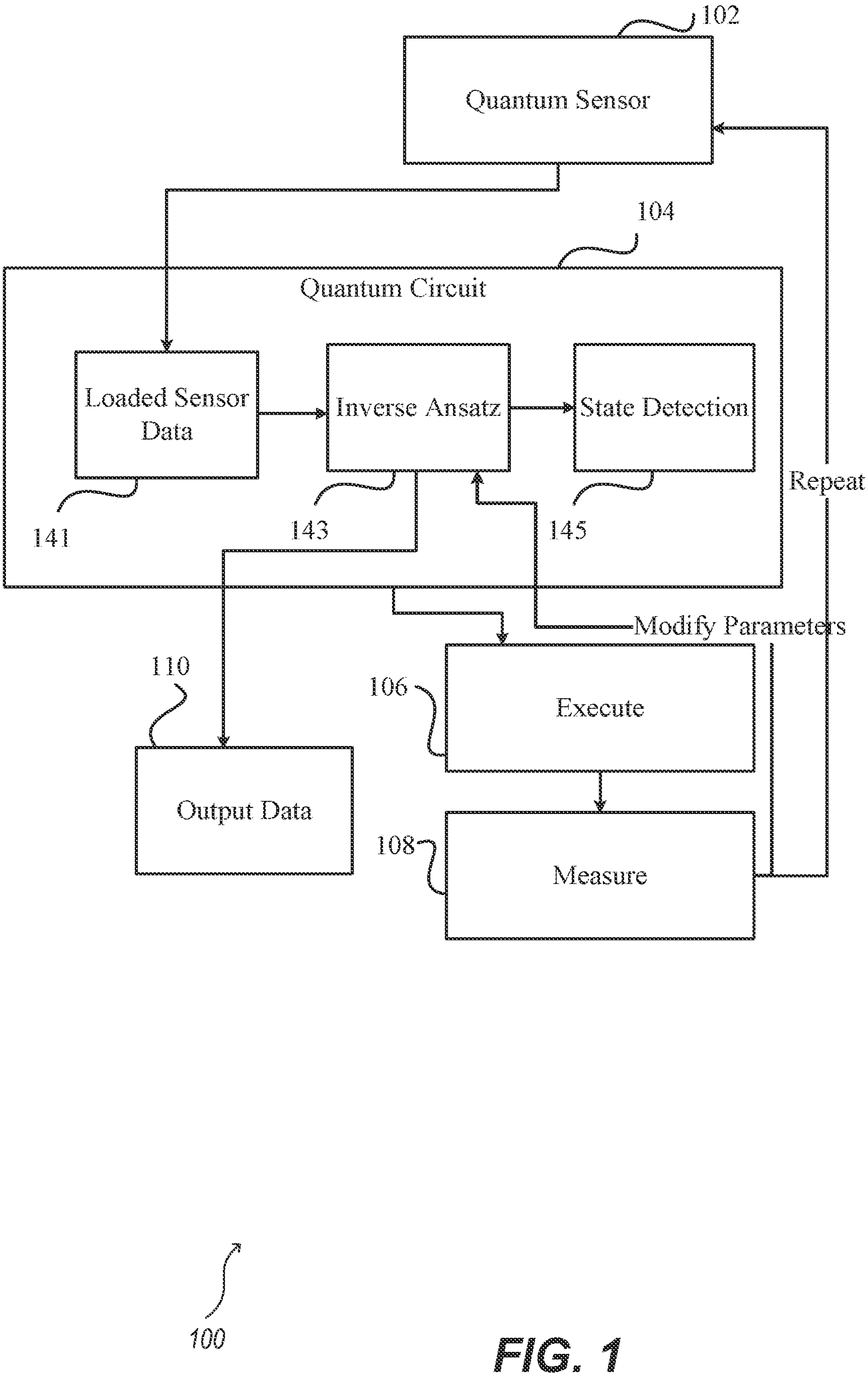
FIG. 1 shows a schematic block diagram, in accordance with some exemplary embodiments of the disclosed subject matter.

One technical problem dealt with by the disclosed subject matter is enhancing the processing capabilities of data obtained from quantum sensors.

In some exemplary embodiments, quantum sensors may be configured to sense, measure, or the like, quantum properties of a sensed physical phenomenon, physical system, physical object, or the like. For example, a quantum sensor may be configured to measure a quantum state of a physical phenomenon. In some exemplary embodiments, quantum sensors may be sensitive to quantum properties such as a magnetic field of atom, a location of an atom, a speed of an atom, a magnetic field of a molecule, a location of a molecule, a speed of a molecule, a quantum state of a physical situation, quantum information processing, quantum information measuring, or the like.

In some exemplary embodiments, quantum sensors may demonstrate superiority over classical sensors, e.g., as disclosed in Hsin-Yuan Huang et al. Quantum advantage in learning from experiments. arXiv:2112.00778 (2022). arxiv.org/abs/2112.00778, which is hereby incorporated by reference in its entirety for all purposes without giving rise to disavowment. For example, the accuracy level of quantum sensor measurements may be higher than the accuracy level of classical sensor measurements.

In some exemplary embodiments, a quantum sensor may store a measurement of one or more quantum properties as a quantum state. In some exemplary embodiments, the information stored in quantum sensors, e.g., the quantum state, may be loadable on a quantum computer, e.g., as disclosed in Vorobyov, V., Zaiser, S., Abt, N. et al. Quantum Fourier transform for nanoscale quantum sensing. npj Quantum Inf 7, 124 (2021). doi.org/10.1038/s41534-021-00463-6, which is hereby incorporated by reference in its entirety for all purposes without giving rise to disavowment.

In some exemplary embodiments, it may be challenging to transfer the quantum state that was measured by the quantum sensor over classical channels, such as in order to evaluate, recover, or restore the quantum state at a receiving entity (e.g., a classical or quantum computer). In some exemplary embodiments, the quantum state that was measured by the quantum sensor may not be directly measurable. In some exemplary embodiments, in order to evaluate, in classical terms, quantum data that is measured by a quantum sensor, the quantum data must be measured a large number of times (e.g., more than a threshold, such as thousands or millions of times) by the quantum sensor. For example, each measurement of the quantum sensor may or may not require to reset the measured physical system, object, phenomenon, or the like, to their initial state.

In some exemplary embodiments, in order to process quantum data that is measured by a quantum sensor, measurements of the quantum data may be performed and records of measurement results may be communicated to a classical or quantum computer. In some cases, the results of each measurement may be sampled, such as using tomography measurements, in order to assess the measured quantum data. In some exemplary embodiments, sampling of each execution may comprise performing a large number of measurements (e.g., more than a threshold), in order to obtain a statistically significant result, to account for statistical fluctuations and errors, or the like. In some cases, the results of each measurement, samples thereof, or the like, may be stored and communicated to a classical or quantum computer.

In some exemplary embodiments, this process of evaluating and/or communicating the quantum state using many executions and measurements may be highly consuming of resources, e.g., time resources, computational power, storage resources, resources for resetting the state of the measured physical system, or the like. It may be desired to overcome such drawbacks, and reduce the number of resources that are required for the evaluation process. For example, it may be desired to reduce a number of measurements of sensed quantum data that is required for estimating the quantum state.

Another technical problem dealt with by the disclosed subject matter is enhancing an effectiveness of storing data that is obtained from quantum sensors. In some exemplary embodiments, the amount of classical storage that is needed for capturing an arbitrary quantum state may be exponential in the number of quantum bits (qubits) of the arbitrary quantum state. It may be desired to overcome such drawbacks, and reduce the amount of classical memory storage that is needed for representing a sensed quantum state.

Yet another technical problem dealt with by the disclosed subject matter is enhancing communication capabilities of data obtained from quantum sensors. For example, it may be desired to communicate a sensed quantum state that is sensed by a quantum sensor, via a classical communication channel, to one or more classical or quantum computers. In some exemplary embodiments, since the amount of classical storage that is needed for representing a quantum state may be exponential in the number of qubits of the quantum state, the conveying of information from quantum sensors to classical computers may be inherently challenging. In some exemplary embodiments, it may be desired to communicate a sensed quantum state to classical computers, remote quantum computers that may not have quantum communication with the quantum sensor, or the like, in a manner that is not resource-consuming.

One technical solution provided by the disclosed subject matter is processing sensed quantum data, in a manner that allows for a reconstruction of an approximation of the sensed quantum data at later times, at different computing platforms, or the like.

In some exemplary embodiments, a quantum sensor may measure a quantum state of an inspected phenomenon, system, object, or the like. In some exemplary embodiments, in order to process the sensed quantum state, the sensed quantum state that was measured by the quantum sensor may be loaded and fed to a set of one or more qubits of a quantum computer. In some exemplary embodiments, the quantum computer may be connectable to the quantum sensor, which may enable the quantum computer to receive the quantum state from the quantum sensor. For example, the quantum computer may be physically wired or connected to the quantum sensor, or may connect to the quantum sensor in a wireless manner, such as by entanglement.

In some cases, the quantum computer may or may not comprise a relatively small computer, that corresponds to an output size of the quantum sensor. For example, the quantum computer may comprise a computer having a minimal number of qubits that is necessary for holding the sensed quantum state from the quantum sensor, having twice the quantity of the minimal number of qubits, having thrice the quantity of the minimal number of qubits, having any other number of times the quantity of the minimal number of qubits, having the quantity of the minimal number of qubits and an additional set of one or more auxiliary qubits, or the like.

In some exemplary embodiments, the set of one or more qubits that hold the sensed quantum state may belong, or be allocated, to a quantum circuit, e.g., a parametric quantum circuit. In some exemplary embodiments, the parametric quantum circuit may be designed for determining the sensed quantum state, evaluating the sensed quantum state, processing the sensed quantum state, or the like. In some exemplary embodiments, the parametric quantum circuit may be designed to comprise the set of qubits on which sensed data is loaded from the quantum sensor. For example, the parametric quantum circuit may be designed to manipulate a plurality of qubits, including at least the set of qubits holding the sensed state, over a plurality of cycles using a plurality of quantum gates.

In some exemplary embodiments, the parametric quantum circuit may comprise a quantum circuit in which at least some of the gates have parameters that are initially unspecified, constitute variables, or the like. In some exemplary embodiments, allowing certain gates to have tunable parameters may introduce flexibility to the parametric quantum circuit. In some exemplary embodiments, these parameters may be adjustable, enabling to optimize the circuit's performance for a specific quantum computation task. In some exemplary embodiments, the parameters may or may not be represented or included in the sensed quantum state from the quantum sensor.

In some exemplary embodiments, the parametric quantum circuit may comprise a set of quantum gates that evolve an initial quantum state at one or more initial cycles of the set of qubits, to a final state encoding an output of the circuit. For example, the final state may comprise a state of one or more output qubits, a state of the set of qubits at an end of the circuit's execution, or the like. In some exemplary embodiments, the initial quantum state of the set of qubits may be provided by the quantum sensor, and may correspond to the sensed quantum state measured by the quantum sensor. For example, the set of one or more qubits may be set, by the quantum sensor, to represent the quantum state at an initial cycle of the parametric quantum circuit, as the initial state of the set of one or more qubits.

In some exemplary embodiments, the parametric quantum circuit may be designed to manipulate the initial state with one or more sub-circuits, gates, quantum operations, or the like. In some exemplary embodiments, the parametric quantum circuit may be designed to comprise an inverse ansatz parametric circuit, a detection circuit, or the like, which may be configured to manipulate the initial state. For example, the inverse ansatz parametric circuit and the detection circuit may comprise subsequent sub-circuits of the parametric quantum circuit, respectively.

In some exemplary embodiments, the inverse ansatz parametric circuit may comprise an inverse of an ansatz parametric circuit. For example, applying both the inverse ansatz parametric circuit and the ansatz parametric circuit on a quantum state may be configured to result with the quantum state (e.g., when ignoring error rates), due to their inverse relationship. In some exemplary embodiments, an ansatz parametric circuit may represent, or implement, an ansatz (e.g., a hypothesis or educated guess) associated with the sensed quantum state. In some exemplary embodiments, the ansatz may be determined and utilized to capture or approximate the sensed quantum state. For example, in case the quantum sensor measures energy of a molecule, the ansatz may represent a hypothesis that attempts to approximate the energy of the molecule. In some exemplary embodiments, the ansatz parametric circuit implementing the ansatz may comprise a circuit that, when executed, is configured to output an approximation of the sensed quantum state, in accordance with the ansatz. In some exemplary embodiments, an inverse ansatz parametric circuit implementing the inverse of the ansatz may comprise a circuit that, when executed, is configured to output an approximation of an inverse of the sensed quantum state. For example, in case the approximation of the sensed quantum state is a value of 4, the approximation of the inverse of the sensed quantum state may be a value of −4.

In some exemplary embodiments, the ansatz may belong to a parameterized family of quantum circuits that can be adjusted by tuning the set of parameters. In some exemplary embodiments, the ansatz may be associated to a set of parameters. In some exemplary embodiments, the set of parameters may comprise any property or parameter that can affect the circuit, such as parameters defining angles of rotation gates, which gate to include or exclude, or the like. In some cases, parameters of the ansatz may correspond to ones disclosed in Harper R. Grimsley et al. An adaptive variational algorithm for exact molecular simulations on a quantum computer. arXiv:1812.11173. Nature Communications 10, 3007 (2019). arxiv.org/abs/1812.11173, which is hereby incorporated by reference in its entirety for all purposes without giving rise to disavowment.

For example, the sensed quantum state may correspond to a state or value of $\pi$, and an ansatz may provide a hypothesis that the sensed quantum state can be approximated by an integer. According to this example, the set of parameters may comprise parameters representing integer values, and the parameters may be tuned with valuations of different integer values (e.g., values of 0, 1, 2, 15, 200, or the like). In some cases, the ansatz may be represented by a circuit (e.g., the ansatz parametric circuit), by a set of parameters, or the like.

In some exemplary embodiments, one or more types of ansätze may be determined. In some exemplary embodiments, in case a physical system is measured by the quantum sensor, a physics-oriented ansatz may be formed from quantum gates that are associated to the physical system. For example, a physics-oriented ansatz may comprise encodings of elements of the physical system Hamiltonian. As another example, a physics-oriented ansatz may comprise encodings of a generic molecular or atomic orbitals. In some exemplary embodiments, a hardware-oriented ansatz may be formulated as a random and maximally condensed quantum circuit that can be efficiently executed on a quantum computer, e.g., in terms of cycle-wise depth, error rates, costs, gate count, or the like. In some exemplary embodiments, any other types of ansätze and associated parameters may be used, e.g., similar to the ansätze and parameters disclosed in M. Cerezo, et al. Variational Quantum Algorithms. arXiv: 2012.09265. Nature Reviews Physics 3, 625-644 (2021), which is hereby incorporated by reference in its entirety for all purposes without giving rise to disavowment (hereinafter referred to as 'M. Cerezo').

In some exemplary embodiments, the ansatz may be predicted or estimated to have at least one set of valuations to the set of parameters, that, when applied to the parameters, provides an approximation of the sensor's data. In some exemplary embodiments, an approximation of the sensor's data may be considered acceptable when it closely aligns with the actual sensed data, adhering to a predefined threshold. For example, the predefined threshold may represent the maximum allowable deviation or difference between the approximated states and the true sensor measurements. In some exemplary embodiments, the approximation may be required to fall within a defined acceptable range, ensuring a level of accuracy deemed satisfactory.

In some exemplary embodiments, the set of parameters of the ansatz may or may not correspond to properties of the measured phenomenon that were measured by the quantum sensor. For example, the quantum sensor may measure a partial state of a molecule, and the set of parameters may define a full state of the molecule. As another example, the quantum sensor may measure a first set of parameters representing a state of a molecule, while the set of parameters of the ansatz may measure a second disjoint set of parameters representing the same state of the molecule.

In some exemplary embodiments, in order to measure whether or not a set of one or more valuations provides an acceptable approximation of the sensed quantum state, an inverse of the ansatz may be applied as the inverse ansatz parametric circuit on the initial state of the set of qubits. In some exemplary embodiments, in case the inverse ansatz parametric circuit corresponds to an inverse of the sensed quantum state, the processed state may correspond to the ground state (the $|0\rangle$ state), the zero state, a near-zero state (the probability of measuring zero from the output being above a certain probability), or the like. In case the resulting state is zero or nearly zero, the ansatz may be determined to correspond to the sensed quantum state, and thus the ansatz may be verified and determined to be correct. In such cases, the valuation of the ansatz that resulted with the zero or near zero measurement, may be stored and utilized to determine the sensed quantum state.

In some exemplary embodiments, the inverse ansatz parametric circuit may be configured to obtain the set of one or more qubits holding the sensed quantum state as input qubits, and output, based thereon, a processed state that is obtained by manipulating the quantum state with one or more gates. In some exemplary embodiments, the inverse ansatz parametric circuit may or may not obtain one or more additional qubits such as auxiliary qubits that are not included in the set of qubits. For example, in case the set of valuations provides an approximation of the sensed quantum state, applying the inverse ansatz parametric circuit on the set of qubits will result with at least a subset of the set of qubits holding a state of zero, near zero, or the like.

It is noted that when relating to the set of qubits having a zero or near zero state, the disclosed subject matter is not limited to all qubits of the set of qubits having a zero or ground state (the $|0\rangle$ state). For example, a subset of measurements of the set of qubits may result with a zero state, with a state that is nearly zero, or the like. In some exemplary embodiments, a state may be considered nearly zero in case the state adheres to a maximum allowable deviation from the zero state (e.g., according to a threshold). In some exemplary embodiments, states of the set of qubits may be sampled over a plurality of circuit executions, measurements, or the like, and their states may be considered to be zero or near zero states based on an average of different measurements of each qubit, a majority vote, or the like.

As an example, a sensed quantum state may correspond to a state of π, and may be loaded to the set of qubits. A user may not have access to the loaded state, and thus the sensed state may be measured indirectly using an ansatz. According to this example, an ansatz may be determined, and may predict that the sensed quantum state can be approximated by an integer value. The ansatz may be utilized for designing, or constructing, an inverse ansatz parametric circuit associated with a parameter p being an integer. For example, the inverse ansatz parametric circuit may subtract the value of p from one or more input qubit states. The parameter p may be instantiated with various integer values. Upon instantiating p with the value of 3, which is a close approximation of the state π, the inverse ansatz parametric circuit may output the set of qubits with a processed state of zero or near zero. For example, instantiating p with the value of 3 may result with a greatest number of zero states of the set of qubits compared to any other valuation of the parameter p. In other cases, the sensed quantum state may correspond to any other quantum state, such as a highly entangled state, a pure state, or the like.

In some exemplary embodiments, the parametric quantum circuit may or may not be designed to comprise a detection sub-circuit, which may be configured to indicate a distance measure between the processed state outputted from the inverse ansatz parametric circuit, and between a predetermined state (e.g., the zero state). For example, in case the predetermined state is zero, the detection sub-circuit may comprise a zero detection sub-circuit, configured to determine whether or not applying the inverse ansatz parametric circuit on the initial state results with a zero or near zero state. In some exemplary embodiments, setting the predetermined state to be zero, may be advantageous, at least since it may increase an efficiency of executing the parametric quantum circuit compared to setting the predetermined state to any other state, value, number, or the like. In some cases, the predetermined state may be set to any other number, value, quantum state, or the like.

In some exemplary embodiments, the detection sub-circuit may be configured to obtain the processed state from the set of one or more qubits, and output one or more output states indicating whether or not the processed state is zero, near zero, or the like. In some cases, the output states may indicate a distance between the processed state and a predetermined state such as zero. In some exemplary embodiments, the detection sub-circuit may output a single output state via a single qubit, may output one or more output states via two or more qubits, or the like. For example, the detection sub-circuit may be configured to output a single zero state in case that the processed states of the set of qubits are determined to be zero or near zero, and to otherwise output a different state such as a state of one. As another example, the detection sub-circuit may be configured to output a state of one in case that the processed states of the set of qubits are determined to be zero or near zero, and to otherwise output a state of zero. In other cases, the detection sub-circuit may be configured to indicate the distance between the processed state and the predetermined state in any other way.

In some cases, the detection sub-circuit may be configured to measure the distance between the processed state and the predetermined state based on an average of different measurements of each qubit, a majority vote, or the like. In some exemplary embodiments, the processed state provided from the inverse ansatz parametric circuit may be determined by the detection sub-circuit to be near zero, such as in case that a certain percentage of samples of measurements of the set of qubits results with zero, near zero, or the like. In some exemplary embodiments, the assessment of the nullness of the processed states may be achieved by any means of verification. For example, the assessment of the nullness of the processed states may correspond to one or more methods disclosed in US Patent Publication Number 20230409953, entitled "Auxiliary Qubit Verification in Quantum Circuits", filed on May 24, 2022, which is hereby incorporated by reference in its entirety for all purposes without giving rise to disavowment.

In some cases, the detection sub-circuit may be omitted from the parametric quantum circuit, and the distance measure between the processed state and between the predetermined state may be determined directly from the output of the inverse ansatz parametric circuit, e.g., using tomography measurements. For example, all states of output qubits from the inverse ansatz parametric circuit may be measured to determine the probability that they indicate a state of zero, and obtaining a statistically significant result may require to execute the parametric quantum circuit a large number of times, e.g., thousands or millions of times. In some cases, in case the processed state is a computational basis (e.g., composed purely of zeros and/or ones), the detection sub-circuit may be omitted, and vice versa. It is noted that the sensed quantum state may not constitute a computational basis. In some cases, using a detection sub-circuit may enable to reduce resources used for measuring the processed state, enhance an accuracy of the measurements, or the like.

In some exemplary embodiments, the valuations of the set of parameters associated with the inverse ansatz parametric circuit may be adjusted iteratively as part of a Variational Quantum Algorithm (VQA), based on an output from the detection sub-circuit. In some exemplary embodiments, a VQA may constitute a quantum algorithm class that may be used for solving optimization problems. In some exemplary embodiments, VQAs may involve an iterative process where a quantum circuit is constructed, executed, and measured; the measurement results may determine the construction of the next iterated circuit. In some exemplary embodiments, the iterations may be executed for different logical variations of logical parameters associated with the parametric quantum circuit. For example, VQA algorithms are disclosed in M. Cerezo. In some cases, VQA schemes may be designed to leverage quantum computers to address problems that classical computers find challenging, such as problems related to optimization and machine learning. In some exemplary embodiments, VQA schemes may enable to exploit quantum parallelism during the evolution of the quantum state.

In some exemplary embodiments, a loop of VQA may be implemented to iteratively adjust valuations for the set of parameters associated with the inverse ansatz parametric circuit. In some exemplary embodiments, each iteration, the output state from the detection sub-circuit may be determined, estimated, measured, or the like, and these measurements may be used, by a classical processor, to update the parameters of the inverse ansatz parametric circuit iteratively, until the algorithm converges to a solution that minimizes an objective function associated with the optimization problem (e.g., resulting with a zero or near zero state).

In some exemplary embodiments, each VQA iteration, the valuations for the set of parameters may be selected or determined to include values in a defined order, random values, values selected by a greedy search algorithm, values selected by a non-greedy search algorithm, or the like. For example, at each iteration, a classical optimization may be carried out with respect to a value function that aims to nullify the final result of the quantum computation. The optimization may be designed to make the resulting quantum state as close as possible to the zero state.

In some exemplary embodiments, for each valuation of the set of parameters, the quantum computer may be configured to execute the parametric quantum circuit using the selected valuation. In some exemplary embodiments, the quantum computer may be configured to execute the parametric quantum circuit a plurality of times, such as in order to accurately measure the output quantum state.

In some exemplary embodiments, a quantum measurement by the quantum sensor may be at least weakly destructive, causing a destruction of at least part of the measured quantum state. In some exemplary embodiments, since VQA is an iterative process, and any quantum measurement is at least weakly destructive, the possibility of changing the measured value at each iteration may be addressed. In some cases, a measurement of a phenomenon in the physical environment may require to reset the phenomenon or its state every measurement of the quantum sensor. For example, in case the measured property is highly quantum and the measurement is not sufficiently weak, the quantum system being measured may be required to be reset before each measurement, such as in order to reconstruct the state being measured. In other cases, a plurality of measurements of the phenomenon may be performed without resetting the phenomenon, such as in case that the destruction is not significant for the result. For example, in case the measured property is classical or semi-classical, or in case the measurement is weak enough, there may be little change of the measured quantity between each iteration, making resetting of the property redundant and not necessary.

In some exemplary embodiments, at the end of the iterative process of the VQA, output data may be generated. In some exemplary embodiments, the output data may comprise a representation or an indication of an approximation of the sensed quantum state, which may be obtained and stored compactly. In some exemplary embodiments, the representation of the quantum state may comprise a compressed or low-resource version of the quantum state approximation, that enables a reconstruction of the quantum state approximation at one or more computing devices.

In some exemplary embodiments, the output data may comprise a representation of the parametric quantum circuit, a representation of the inverse ansatz parametric circuit, a representation of the ansatz parametric circuit, a set of ansatz parameters associated parametric quantum circuit, a selected valuation of the ansatz parameters, an indication of the type or properties of the parametric quantum circuit, a value reconstruction circuit that is configured to reconstruct the parameter values or the quantum state approximation, a combination thereof, or the like. For example, the output data may comprise a compressed representation of a value reconstruction circuit that, when executed on a quantum computer, or simulated by a classical simulator of a quantum computer, will generate the approximation of the quantum state.

In some cases, the output data may not comprise a representation of the parametric quantum circuit itself, but rather a representation of the inverse ansatz parametric circuit that excludes the loaded quantum state. In some exemplary embodiments, instead of generating a representation of the entire parametric quantum circuit, a representation of the inverse ansatz may be generated. In some exemplary embodiments, the inverse ansatz parametric circuit may enable to reconstruct the quantum state approximation, such as along with the ansatz parameters, a corresponding predetermined state of the detection sub-circuit, or the like. For example, the inverse ansatz parametric circuit may be provided along with one or more predetermined states, corresponding valuations, or the like. In some cases, the output data may comprise a representation of the ansatz parametric circuit, instead of the inverse ansatz parametric circuit.

In some cases, the output data may not comprise a representation of the parametric quantum circuit itself, a sub-circuit thereof, or the like, and instead, the output data may comprise the set of ansatz parameters (with the respective valuations, predetermined states of the detection sub-circuit, or the like). In some exemplary embodiments, the parameters of the ansatz may be provided as a compressed version of the parametric quantum circuit or portions thereof, and may enable to reconstruct the approximation of the sensed quantum state. For example, in case the inverse ansatz parametric circuit removes a value of five from the loaded quantum state, the output data may be set to comprise the parameter value of five, the predetermined state of zero, or the like.

In some exemplary embodiments, the output data may be a compressed version, that uses less storage and communication capacity, compared to conducting tomography measurements of the sensed system directly. In some exemplary embodiments, the output data may be a compressed version, that uses less storage and communication capacity, compared to conducting and storing records of a plurality of measurements of the sensed quantum state. In some exemplary embodiments, the output data may be obtained using exponentially less measurements and samples compared to conducting tomography measurements of the sensed system directly.

In some exemplary embodiments, the output data may be communicated to a classical computer, a remote quantum computer that is not entangled with the quantum computer that executed the parametric quantum circuit, a classical computing cloud, a quantum computing cloud, a quantum execution platform, or the like. In some exemplary embodiments, the output data may be communicated via a classical communication medium such as long-distance communication, short distance communication, wireless communication, wired communication, or the like. For example, the output data may be communicated via WIFI™ communication. In some exemplary embodiments, an output module may be configured to provide the output data, an indication of the compressed data, or the like. For example, the output module may be comprised by the quantum computer over which the parametric quantum circuit was executed, and the quantum computer may provide the output data via one or more mediums to a separate and/or remote device.

For example, the output data may be communicated to a remote quantum computer. According to this example, the quantum state may be compactly represented by the ansatz parameters, enabling the remote quantum computer to reconstruct an approximation of the quantum state by executing a corresponding ansatz parametric circuit with the valuations of the ansatz parameters. According to this example, the remote quantum computer may generate the ansatz parametric circuit locally, obtain the ansatz parametric circuit from a third party, obtain the ansatz parametric circuit from the quantum computer that is attached to the quantum sensor, obtain the ansatz parametric circuit from a user such as a programmer, or the like.

As another example, the output data may be communicated to a classical computer. According to this example, since classical computers may not be able to execute quantum circuit, the data may be absent of any circuit representation, and may instead include solely ansatz parameters.

One technical effect obtained by the disclosed subject matter is enabling to process sensed quantum states, and communicate them to classical computers, remote quantum computers, or the like.

Another technical effect obtained by the disclosed subject matter is enabling to communicate and process sensed quantum states while reducing computational resources, communication overhead, storage resources, or the like. In some exemplary embodiments, the reduction of resources may be exponential to the number of samples of the quantum state. In some exemplary embodiments, instead of storing a quantum state on classical parameters, which may be resource consuming, an approximation of the quantum state may be generated and represented by one or more classical parameters. For example, in case the sensed quantum state is loaded on 20 qubits, 2,097,150 (or 2^21-2) classical parameters may be required to load the same state, while using the disclosed subject matter, one or more classical parameters may be used (e.g., the set of parameters of the inverse ansatz parametric circuit).

Yet another technical effect obtained by the disclosed subject matter is enabling to process sensed quantum states using a compact quantum computer. In some cases, a quantum computer that executes the parametric quantum circuit may or may not comprise a relatively small computer, that corresponds in size to a size (in terms of qubits) of an output of the quantum sensor. In some cases, in case the quantum sensor is not connected to a quantum computer, the sensed quantum state of the quantum sensor may be sampled directly from the quantum sensor, which may require a resource consuming tomography measuring process, and may thus be suboptimal.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, showing a schematic block diagram, in accordance with some exemplary embodiments of the disclosed subject matter.

In some exemplary embodiments, Block Diagram 100 may depict blocks, each of which represents a component, stage, or subsystem of the disclosed subject matter, while interconnections between the blocks may illustrate how these components interact or are related in terms of functionality or information flow.

As depicted in FIG. 1, a flow of Block Diagram 100 starts with Quantum Sensor 102 measuring a quantum state, and loading the quantum state to a set of qubits of Quantum Circuit 104. For example, Loaded Sensor Data 141 may represent the set of qubits holding the quantum state. In some exemplary embodiments, Loaded Sensor Data 141 may comprise a set of qubits that are initialized with the quantum state at a start of Quantum Circuit 104, which are subsequently manipulated by Inverse Ansatz 143 or State Detection 145. In some exemplary embodiments, Loaded Sensor Data 141 may be absent of any logical gates.

In some exemplary embodiments, when executing Quantum Circuit 104, Loaded Sensor Data 141 may be manipulated by Inverse Ansatz 143. In some exemplary embodiments, Inverse Ansatz 143 may implement an inverse of an ansatz attempting to approximate the sensed quantum state that was measured by Quantum Sensor 102. In some exemplary embodiments, Inverse Ansatz 143 may apply one or more quantum operations to Loaded Sensor Data 141, and generate a processed version of the quantum state, which may be fed to State Detection 145. In some exemplary embodiments, State Detection 145 may determine whether the processed data from Inverse Ansatz 143 is a predefined state such as zero, near zero, or the like. For example, State Detection 145 may output an indication of the nullness of the processed data.

In some exemplary embodiments, Loaded Sensor Data 141, Inverse Ansatz 143, and State Detection 145, may or may not differ in the number of qubits utilized thereby. For example, while Loaded Sensor Data 141 and State Detection 145 may comprise a same number of qubits (although they may not necessarily be identical qubits), Inverse Ansatz 143 may in some cases manipulate a greater number of qubits than Loaded Sensor Data 141, a same number of qubits as Loaded Sensor Data 141, or the like. For example, Inverse Ansatz 143 may utilize additional auxiliary qubits that are not used by Loaded Sensor Data 141 or State Detection 145.

In some exemplary embodiments, Quantum Circuit 104 may be executed by Execute 106, and its results may be measured by Measure 108. For example, Execute 106 may execute Quantum Circuit 104 once, a plurality of times, or the like. In some cases, a phenomenon measured by Quantum Sensor 102 may or may not be reset every execution, every measurement of Quantum Sensor 102, every defined number of measurements of Quantum Sensor 102, every defined number of executions of Quantum Circuit 104, or the like. In some cases, Measure 108 may measure an output state of the execution using tomography measurements, or using any other technique. For example, Measure 108 may measure the nullness indication of State Detection 145.

In some exemplary embodiments, a VQA scheme may be implemented to iteratively adjust parameter values of Inverse Ansatz 143, according to outputs from State Detection 145. For example, the parameters of Inverse Ansatz 143 may be adjusted as part of the VQA scheme, thereby providing different valuations to the parameters every iteration. It is noted that a single iteration may comprise a single execution of Quantum Circuit 104, a plurality of executions of Quantum Circuit 104, or the like. In some exemplary embodiments, every iteration, the parameters of Inverse Ansatz 143 may be adjusted, such as according to the output from State Detection 145. In some exemplary embodiments, the output from Inverse Ansatz 143 or State Detection 145 may be used, by a classical processor, to update the parameters of Inverse Ansatz 143 iteratively, until State Detection 145 detects a state of zero or near zero, until Inverse Ansatz 143 output a zero or near zero state, or the like.

In some exemplary embodiments, in case State Detection 145 indicates a result different from zero or near zero, the parameter values of Inverse Ansatz 143 may be adjusted. Otherwise, Output Data 110 may be generated. For example, Output Data 110 may be generated to comprise parameter values of Inverse Ansatz 143 that caused State Detection 145 to detect a state of zero.

Figure 2:
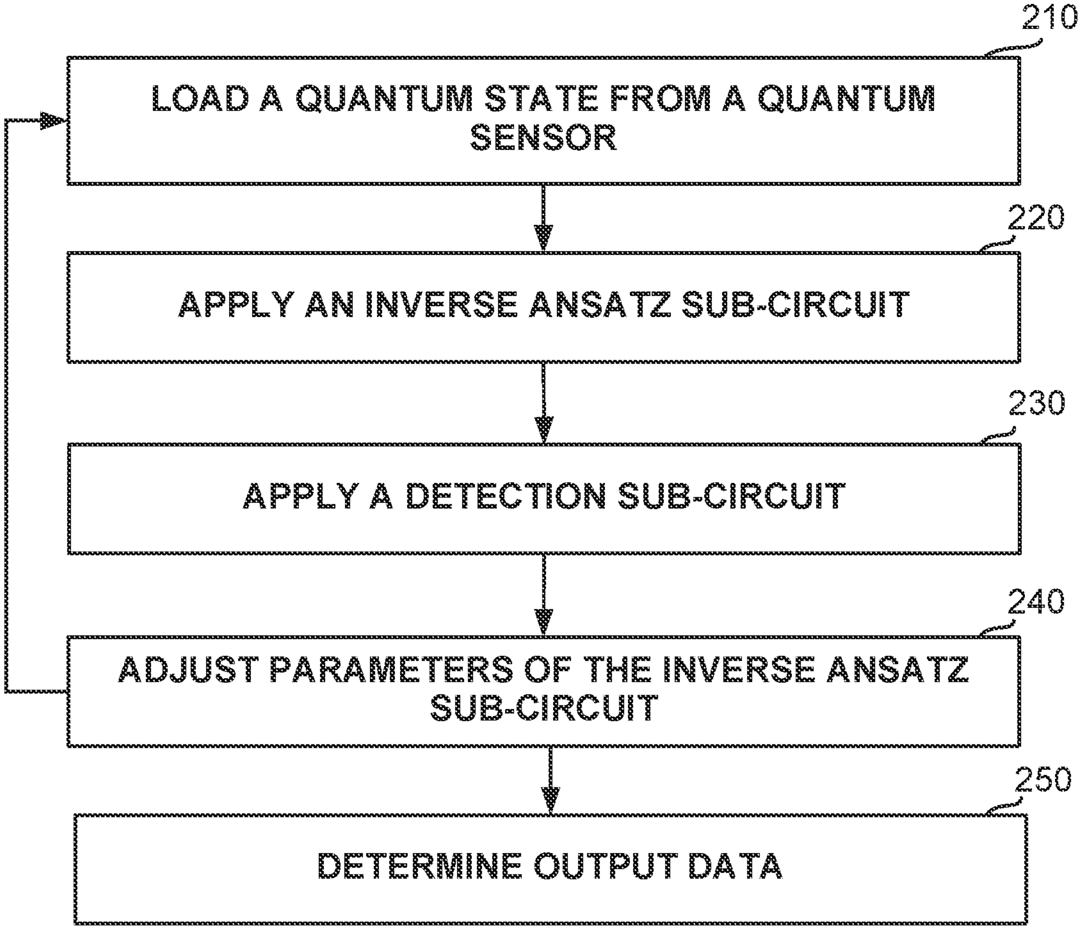
FIG. 2 shows an exemplary flowchart diagram of a method, in accordance with some exemplary embodiments of the disclosed subject matter.

Referring now to FIG. 2, showing an exemplary flowchart diagram of a method, in accordance with some exemplary embodiments of the disclosed subject matter.

On Step 210, a quantum state measured by a quantum sensor may be loaded on a set of one or more qubits of a quantum computer. In some exemplary embodiments, the quantum sensor may be configured to measure a quantum state of a physical phenomenon, object, or the like. For example, the quantum sensor may be configured to measure a location of an atom, e.g., spatial coordinates of the atom at the time of measurement.

In some exemplary embodiments, the quantum computer on which the quantum state is loaded, may be connectable to the quantum sensor via one or more mediums, e.g., physical connections, wireless connections, or the like, which may be quantum or classical. In some cases, the quantum computer may comprise a minimal-sized quantum computer, in terms of qubits, that is capable of implementing the method of Steps 210-250 for the quantum sensor. In other cases, the quantum computer may comprise any other sized computer, having any other number of qubits. In some exemplary embodiments, one or more mediums may enable the quantum computer to receive the quantum state from the quantum sensor.

In some exemplary embodiments, the quantum computer may receive the quantum state by loading the quantum state on a set of one or more qubits of the quantum computer. In some exemplary embodiments, the quantum computer may comprise at least the set of qubits over which the quantum state is loaded. For example, the quantum state may be loaded on a subset of the qubits of the quantum computer, on all of the qubits of the quantum computer, or the like.

In some exemplary embodiments, the set of one or more qubits that is loaded with the quantum state, may be part of a parametric quantum circuit. In some exemplary embodiments, the parametric quantum circuit may comprise one or more qubits that are set, by the quantum sensor, to represent the quantum state at an initial cycle of the parametric quantum circuit. In some exemplary embodiments, the quantum state may be loaded on a set of one or more qubits as an initial state of a quantum circuit.

In some cases, the quantum sensor and quantum computer may be housed in a single physical device, in separate physical devices, or the like. In case they are housed in a single physical device, the quantum computer may constitute an on-sensor embedded quantum computer. For example, an on-sensor embedded quantum computer may comprise a quantum computer that is embedded directly onto a quantum sensor. According to this example, the integration of the quantum computer with the quantum sensor may enhance a data acquisition process of the sensed quantum state. In other cases, the quantum sensor and quantum computer may be housed in separate devices, and connected via a medium such as a wire.

On Step 220, an inverse ansatz parametric circuit may be the applied on the quantum state. In some exemplary embodiments, the parametric quantum circuit may be designed to comprise the inverse ansatz parametric circuit as a sub-circuit thereof.

In some exemplary embodiments, the inverse ansatz parametric circuit may comprise an inverse of an ansatz parametric circuit, implementing an ansatz. In some exemplary embodiments, the ansatz may comprise a hypothesis or assumption associated with the quantum state (e.g., for guessing the quantum state), that may be based on one or more parameters. In some exemplary embodiments, the ansatz may be assumed to correspond to the quantum state (e.g., under a defined accuracy threshold) when using a certain selection of one or more parameter valuations. In some exemplary embodiments, an inverse of the ansatz may correspond to a subtraction of the ansatz of the quantum state.

In some exemplary embodiments, the inverse ansatz parametric circuit may comprise one or more quantum gates or other quantum operations that manipulate the set of qubits holding the quantum state of the quantum sensor, e.g., according to the inverse ansatz. In some exemplary embodiments, after the set of qubits is manipulated by the inverse ansatz parametric circuit, the set of qubits may hold one or more manipulated or processed quantum states. In some exemplary embodiments, the inverse ansatz parametric circuit may be configured to apply one or more quantum operations on the qubits that hold the sensor's quantum state, and output a processed state that is based on the sensor's quantum state. For example, the processed state may comprise a subtraction of the ansatz from the initial quantum state.

On Step 230, the processed quantum state held by the set of qubits after the inverse ansatz parametric circuit is applied, may or may not be further processed by a detection sub-circuit. In some cases, the parametric quantum circuit may be designed to comprise a detection sub-circuit subsequently to the inverse ansatz parametric circuit. In some cases, the detection sub-circuit may be configured to measure a nullness of one or more states of the set of qubits, such as being measuring a distance between the processed states of the qubits and between a predetermined state, e.g., zero. In some cases, the predetermined state may be zero, and the detection sub-circuit may constitute a zero detection sub-circuit. In other cases, the predetermined state may comprise any other state or value (e.g., 1, 2, 50, or the like), and the detection sub-circuit may be configured to measure a distance between the predetermined state and one or more states of the set of qubits. In some exemplary embodiments, the detection sub-circuit may be configured to indicate whether or not the one or more states of the set of qubits are null, zero, near-zero, or the like.

In some exemplary embodiments, the quantum computer may be configured to execute the parametric quantum circuit, including the inverse ansatz parametric circuit and the detection sub-circuit, a plurality of times. In some cases, in order to measure the quantum state, the measured phenomenon may be set (e.g., by setting a same atom position) before every measurement of the quantum sensor. In other cases, the measured phenomenon may not be set for subsequent measurements, may be set for a subset of subsequent measurements, or the like.

In some exemplary embodiments, the plurality of executions may enable to estimate the result of the detection sub-circuit, and infer based thereon whether the valuation of the inverse ansatz parametric circuit was accurate, a level of accuracy thereof, or the like. In some exemplary embodiments, as the number of executions increases, the accuracy of the estimation may increase. In some cases, instead of measuring the result of the detection sub-circuit, Step 230 may not be implemented, and instead a quantum state resulting from applying the inverse ansatz parametric circuit may be measured directly, compared to a predefined state, or the like.

On Step 240, parameters of the inverse ansatz parametric circuit may be adjusted, e.g., based on the execution of the parametric quantum circuit.

In some exemplary embodiments, the quantum computer may be configured to implement a VQA scheme, in which parameter values of the inverse ansatz parametric circuit are iteratively adjusted, e.g., until the ansatz is determined to be a good enough approximation of the quantum state (such as according to a defined error rate, accuracy score, or any other threshold). In some exemplary embodiments, the physical phenomenon may or may not be configured to be adjusted between iterations of the VQA scheme.

In some exemplary embodiments, the values of the parameters may be configured to be adjusted between iterations of the VQA scheme, e.g., manually by a user, automatically such as by a search algorithm, or the like. For example, the parameters may be configured to be adjusted between iterations according to a binary search algorithm. In some exemplary embodiments, every iteration of the VQA scheme, a valuation of parameters of the inverse ansatz parametric circuit may be adjusted on Step 240, and Steps 210-240 may be iteratively performed. In some cases, every iteration of the VQA scheme may include a plurality of executions of the parametric quantum circuit, a single execution, or the like.

In some exemplary embodiments, iterations of the VQA scheme may be executed until valuations of the parameters of the inverse ansatz parametric circuit result with an approximation of a predetermined state such as zero. For example, in case the detection sub-circuit indicates that a result of zero, near zero, or the like was measured, the parameter values that were used for the inverse ansatz parametric circuit may be determined to have generated an inverse of the quantum state. In such cases, the ansatz with the parameter values may be determined to be a correct approximation of the quantum state. For example, the ansatz may comprise an inverse of the inverse ansatz parametric circuit, and the parameter values may be the same parameters that were used for the inverse ansatz parametric circuit, an inverse thereof, or the like.

In some exemplary embodiments, the detection sub-circuit may indicate a result of zero or near zero in case a distance between one or more measured states of qubits and between a state of zero is less than a predefined threshold. For example, the threshold may represent the maximum allowable deviation or difference between the measured states and the zero state.

On Step 250, output data that indicates an approximation of the quantum state may be generated, determined, or the like, based on an output of the parametric quantum circuit. It is noted that data may be considered to "indicate" a state in case the state can be reconstructed, inferred, or determined in any way based on the data. In some cases, the output data may be determined or generated by an output module, based on an output from the detection sub-circuit (e.g., which constitutes the output of the parametric quantum circuit). In some exemplary embodiments, the output data may represent, or indicate, an approximation of the quantum state that was loaded to the parametric quantum circuit from the quantum sensor. In some cases, the output data may comprise data that, when processed, can be used to reconstruct the approximation. In some cases, the output data may not comprise the approximation of the quantum state, but rather may comprise data that can be used to reconstruct the approximation, data that represents the approximation directly or indirectly, or the like. In some exemplary embodiments, the output data may be determined based on the inverse ansatz parametric circuit, the valuations of the set of parameters that was used on the final iteration, or the like.

In some exemplary embodiments, the output data may comprise a representation of the parametric quantum circuit and the parameter values that were used in the last iteration, measurement, or the like. In some exemplary embodiments, an approximation of the quantum state may be reconstructed by executing the parametric quantum circuit with the same parameter values.

In some exemplary embodiments, the output data may comprise the ansatz parametric circuit and the parameter values that were used in the last iteration, measurement, or the like, e.g., without the parametric quantum circuit. In some exemplary embodiments, since the inverse ansatz parametric circuit may comprise an inverse of the ansatz parametric circuit, an approximation of the quantum state may be reconstructed by executing the ansatz parametric circuit with the same or inverse parameter values.

In some exemplary embodiments, the output data may comprise the parameter values without the ansatz parametric circuit, the parametric quantum circuit, or the like. In some exemplary embodiments, an approximation of the quantum state may be reconstructed, at a computing device, by applying the parameter values on a circuit of the computing device. For example, the circuit may correspond to the ansatz parametric circuit, and the computing device may obtain the circuit from a third party, may obtain a representation thereof, may generate the circuit locally, or the like.

In some exemplary embodiments, the output data may comprise a representation of a value reconstruction circuit, e.g., without the ansatz parametric circuit, the parametric quantum circuit, or the like. In some cases, a value reconstruction circuit may be configured to reconstruct a value associated with the quantum state. For example, the value reconstruction circuit may be configured to reconstruct the parameter values, the approximation of the quantum state, or the like.

In some exemplary embodiments, the output data may be transmitted to a second quantum computer in a non-quantum communication channel, e.g., via a classical communication channel. For example, the output module may be configured to transmit the output data to a second quantum computer via a classical communication channel. In some exemplary embodiments, the second quantum computer may be part of a quantum cloud computing platform, a quantum computer that is remote and not entangled with the quantum computer, or the like.

In some exemplary embodiments, the second quantum computer may be enabled to reconstruct the approximation of the quantum state based on the output data. In some exemplary embodiments, the second quantum computer may be enabled to reconstruct the approximation of the quantum state based on the output data, based on an inverse of a value reconstruction circuit, or the like.

In some exemplary embodiments, the output data may be transmitted to a classical computer. For example, the compression output module may be configured to transmit the output data, e.g., the parameter values. In some exemplary embodiments, the classical computer may be enabled to utilize the output data to approximate the quantum state.

Figure 3:
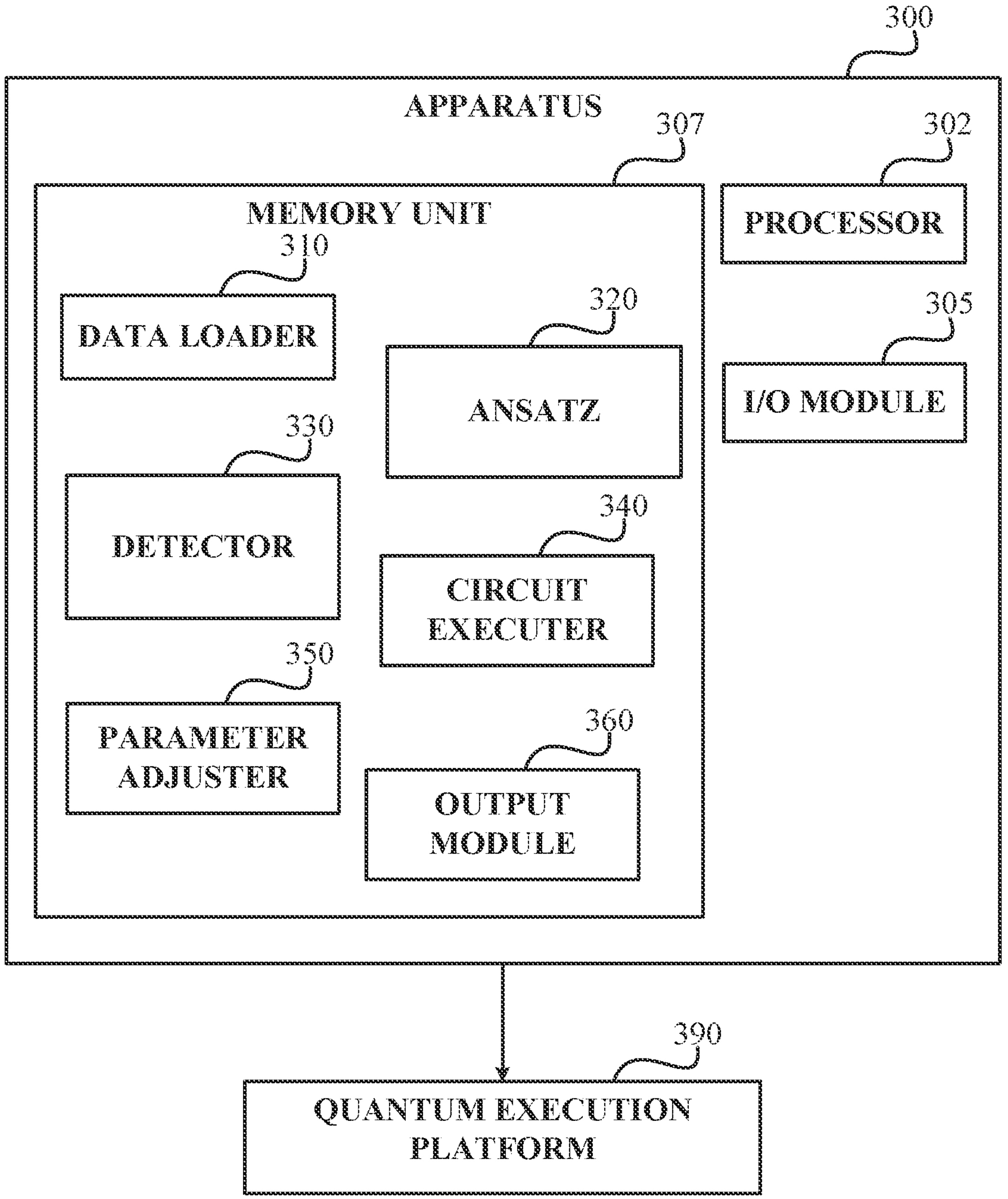
FIG. 3 shows an exemplary block diagram of an apparatus, in accordance with some exemplary embodiments of the disclosed subject matter.

Referring now to FIG. 3 showing a block diagram of an apparatus, in accordance with some exemplary embodiments of the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like.

Processor 302 may be utilized to perform computations required by Apparatus 300 or any of its subcomponents. It is noted that Processor 302 may be a traditional processor, and not necessarily a quantum processor.

In some exemplary embodiments of the disclosed subject matter, Apparatus 300 may comprise an Input/Output (I/O) module 305. I/O Module 305 may be utilized to provide an output to and receive input from a user, an apparatus, or the like, such as, for example to communicate with quantum hardware, to communicate with a remote quantum computer, to communicate with a classical computer, or the like.

In some exemplary embodiments, Apparatus 300 may comprise Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300. Memory 307 may comprise one or more components as detailed below, implemented as executables, libraries, static libraries, functions, or any other executable components.

In some exemplary embodiments, Memory 307 may comprise a Data Loader 310. Data Loader 310 may be configured to load at least one quantum state from a quantum sensor on one or more qubits.

In some exemplary embodiments, Memory 307 may comprise an Ansatz 320, which may be configured to attempt to approximate the quantum state. For example, Ansatz 320 may comprise a sub-circuit that manipulates qubits according to a determined ansatz and associated parameter values, under the assumption that a valuation of the parameters exists such that the sub-circuit approximated the quantum state.

In some exemplary embodiments, Memory 307 may comprise a Detector 330, which may be configured to obtain qubits that are manipulated by an inverse of Ansatz 320, and detect whether they correspond to a predefined state such as ground state.

In some exemplary embodiments, Memory 307 may comprise a Circuit Executer 340, which may be configured to execute a parametric quantum circuit that is initialized by Data Loader 310 and includes an inverse of Ansatz 320, Detector 330, or the like. For example, Circuit Executer 340 may execute the parametric quantum circuit on Quantum Execution Platform 390 a plurality of time for each valuation of parameters, a single time for each valuation of parameters, or the like. In some exemplary embodiments, Quantum Execution Platform 390 may comprise at least one quantum computer, at least one quantum computing cloud, a combination thereof, or the like.

In some exemplary embodiments, Memory 307 may comprise a Parameter Adjuster 350, which may be configured to obtain an outcome of an execution by Circuit Executer 340, and based thereon determine whether to adjust parameters of the inverse of Ansatz 320, how to adjust the parameters, or the like. For example, in case Detector 330 indicates that an inverse of Ansatz 320 did not result with a zero or near zero state, Parameter Adjuster 350 may adjust parameters of Ansatz 320 to values that are estimated to result with a state that is nearer to ground state. Otherwise, in case an inverse of Ansatz 320 did result with a zero or near zero state, Parameter Adjuster 350 may indicate to Output Module 360 that a satisfying approximation of the quantum state was found.

In some exemplary embodiments, Memory 307 may comprise an Output Module 360, which may be configured to generate output data, e.g., a compressed version of an approximation of the quantum state. For example, Output Module 360 may generate output data to include parameters of Ansatz 320, a representation of Ansatz 320, or the like. In some cases, Output Module 360 may communicate the output data, via a classical medium such as I/O Module 305, to one or more classical computers, remote quantum computers, or the like.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A system comprising:

a quantum sensor that is configured to measure a quantum state of a physical phenomenon;

a quantum computer that is connectable to said quantum sensor, whereby enabling said quantum computer to receive the quantum state from said quantum sensor;

said quantum computer is configured to execute a parametric quantum circuit a plurality of times, wherein the parametric quantum circuit comprising one or more qubits that are set, by said quantum sensor, to represent the quantum state at an initial cycle of the parametric quantum circuit, the parametric quantum circuit comprising an inverse ansatz parametric circuit, the inverse ansatz parametric circuit is configured to receive the quantum state from the one or more qubits, whereby the inverse ansatz parametric circuit is configured to output a processed state;

wherein said quantum computer is configured to implement a Variational Quantum Algorithm (VQA) scheme to iteratively set parameter values of the inverse ansatz parametric circuit until obtaining a parameter value that causes the parametric quantum circuit to output an approximation of a predetermined state; and an output module, said output module is configured to provide output data that indicates an approximation of the quantum state, wherein the output data is determined based on the inverse ansatz parametric circuit and the parameter value.

2. The system of claim 1, wherein said output module is configured to transmit the output data to a second quantum computer in a non-quantum communication channel, wherein said transmit enables the second quantum computer to reconstruct the approximation of the quantum state based on the output data.

3. The system of claim 2, wherein the second quantum computer is part of a quantum cloud computing platform.

4. The system of claim 2, wherein the second quantum computer is enabled to reconstruct the approximation of the quantum state based on a value reconstruction circuit, the value reconstruction circuit is configured to reconstruct the approximation of the quantum state, wherein the output data comprises a representation of the value reconstruction circuit.

5. The system of claim 1, wherein the output data is a representation of an ansatz parametric circuit with the parameter value, wherein the inverse ansatz parametric circuit is an inverse circuit of the ansatz parametric circuit, whereby enabling a second quantum computer to reconstruct the approximation of the quantum state by executing the ansatz parametric circuit with the parameter value.

6. The system of claim 1, wherein the output data is the parameter value, whereby enabling a second quantum computer to reconstruct the approximation of the quantum state by utilizing an ansatz parametric circuit with the parameter value, wherein the inverse ansatz parametric circuit is an inverse circuit of the ansatz parametric circuit.

7. The system of claim 1, wherein said system is configured to reset the quantum state of the physical phenomenon between iterations of the VQA scheme.

8. The system of claim 1, wherein said output module is configured to transmit the output data to a classical computer, wherein said transmit enables the classical computer to utilize the output data to approximate the quantum state.

9. The system of claim 1, wherein said quantum sensor and quantum computer are housed in a single physical device, whereby the quantum computer is an on-sensor embedded quantum computer.

10. The system of claim 1, wherein the parametric quantum circuit comprises a detection sub-circuit, the detection sub-circuit is configured to indicate a distance measure of the processed state from the predetermined state.

11. The system of claim 10, wherein the predetermined state is zero and the detection sub-circuit is a zero detection sub-circuit.

12. The system of claim 1, wherein the predetermined state is zero.

13. The system of claim 1, wherein the output data comprises compressed data that represents the quantum state in a compressed manner.

14. The system of claim 1, wherein the quantum computer comprises a minimal-sized quantum computer that can implement the VQA scheme for the quantum sensor.

15. An apparatus comprising a processor and coupled memory, said processor being adapted to:

receive, at a quantum computer that is connectable to a quantum sensor, a quantum state of a physical phenomenon, wherein said receive comprises receiving the quantum state from the quantum sensor, wherein the quantum sensor is configured to measure the quantum state of the physical phenomenon;

execute, at the quantum computer, a parametric quantum circuit, wherein the parametric quantum circuit comprising one or more qubits that are set, by said quantum sensor, to represent the quantum state at an initial cycle of the parametric quantum circuit, the parametric quantum circuit comprising an inverse ansatz parametric circuit, the inverse ansatz parametric circuit is configured to receive the quantum state from the one or more qubits, whereby the inverse ansatz parametric circuit is configured to output a processed state;

implement, at the quantum computer, a Variational Quantum Algorithm (VQA) scheme to iteratively set parameter values of the inverse ansatz parametric circuit for different executions of the parametric quantum circuit until obtaining a parameter value that causes the parametric quantum circuit to output an approximation of a predetermined state; and provide output data that indicates an approximation of the quantum state, wherein the output data is determined based on the inverse ansatz parametric circuit and the parameter value.

16. The apparatus of claim 15, wherein said processor is adapted to transmit the output data to a second quantum computer in a non-quantum communication channel, wherein said transmit enables the second quantum computer to reconstruct the approximation of the quantum state based on the output data.

17. The apparatus of claim 15, wherein the output data is a representation of an ansatz parametric circuit with the parameter value, wherein the inverse ansatz parametric circuit is an inverse circuit of the ansatz parametric circuit, whereby enabling a second quantum computer to reconstruct the approximation of the quantum state by executing the ansatz parametric circuit with the parameter value.

18. The apparatus of claim 15, wherein the output data is the parameter value, whereby enabling a second quantum computer to reconstruct the approximation of the quantum state by utilizing an ansatz parametric circuit with the parameter value, wherein the inverse ansatz parametric circuit is an inverse circuit of the ansatz parametric circuit.

19. The apparatus of claim 15, wherein the parametric quantum circuit comprises a detection sub-circuit, the detection sub-circuit is configured to indicate a distance measure of the processed state from the predetermined state.

20. A method comprising:

receiving, at a quantum computer that is connectable to a quantum sensor, a quantum state of a physical phenomenon, wherein said receiving comprises receiving the quantum state from the quantum sensor, wherein the quantum sensor is configured to measure the quantum state of the physical phenomenon;

executing, at the quantum computer, a parametric quantum circuit, the parametric quantum circuit comprising one or more qubits that are set, by said quantum sensor, to represent the quantum state at an initial cycle of the parametric quantum circuit, the parametric quantum circuit comprising an inverse ansatz parametric circuit, the inverse ansatz parametric circuit is configured to receive the quantum state from the one or more qubits, whereby the inverse ansatz parametric circuit is configured to output a processed state;

implementing, at the quantum computer, a Variational Quantum Algorithm (VQA) scheme to iteratively set parameter values of the inverse ansatz parametric circuit for different executions of the parametric quantum circuit until obtaining a parameter value that causes the parametric quantum circuit to output an approximation of a predetermined state; and providing output data that indicates an approximation of the quantum state, wherein the output data is determined based on the inverse ansatz parametric circuit and the parameter value.

* * * * *